(12) United States Patent
Steinmann et al.

(10) Patent No.: US 8,998,494 B2
(45) Date of Patent: Apr. 7, 2015

(54) DRY GAS THRUST BEARING FOR USE IN ROTATING EQUIPMENT

(71) Applicants: Detlev Steinmann, Waltrop (DE); Jack Thom, Plainwell, MI (US); Timothy D Carpenter, Kalamazoo, MI (US); Chris Buiter, Byron Center, MI (US); Bryan Bradshaw, Portage, MI (US); Michael Spaid, Vicksburg, MI (US)

(72) Inventors: Detlev Steinmann, Waltrop (DE); Jack Thom, Plainwell, MI (US); Timothy D Carpenter, Kalamazoo, MI (US); Chris Buiter, Byron Center, MI (US); Bryan Bradshaw, Portage, MI (US); Michael Spaid, Vicksburg, MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 13/836,673

(22) Filed: Mar. 15, 2013

(65) Prior Publication Data

US 2014/0105525 A1    Apr. 17, 2014

Related U.S. Application Data

(60) Provisional application No. 61/613,059, filed on Mar. 20, 2012.

(51) Int. Cl.
F16C 32/06    (2006.01)
F16C 17/04    (2006.01)
F16C 27/08    (2006.01)

(52) U.S. Cl.
CPC ............. *F16C 32/0603* (2013.01); *F16C 17/04* (2013.01); *F16C 27/08* (2013.01); *F16C 2360/42* (2013.01)

(58) Field of Classification Search
CPC ...... F16C 32/0603; F16C 17/04; F16C 27/08; F16C 2360/42
USPC ......... 384/124, 121, 123, 223–225, 303, 304, 384/368, 420, 424
See application file for complete search history.

(56) References Cited

U.S. PATENT DOCUMENTS

| 1,349,157 | A | * | 8/1920 | Kingsbury ................... 384/125 |
| 2,778,696 | A | | 1/1957 | Lease |
| 3,734,581 | A | * | 5/1973 | LeBreton ..................... 384/304 |
| 3,826,544 | A | * | 7/1974 | Anderson et al. ............. 384/303 |
| 3,982,797 | A | | 9/1976 | Tschirky et al. |

(Continued)

FOREIGN PATENT DOCUMENTS

JP    2004/036790    2/2004

OTHER PUBLICATIONS

The International Search Report and Written Opinion of the International Searching Authority for PCT/US2013/032901, date completed Jun. 14, 2013, date mailed Jun. 25, 2013.

*Primary Examiner* — Thomas R. Hannon
(74) *Attorney, Agent, or Firm* — Miller, Canfield, Paddock and Stone; Mark L Maki

(57) ABSTRACT

A dry gas thrust bearing is provided for use in rotating equipment and more particularly, this thrust bearing is designed to support compressor/turbine thrust loads in an improved arrangement which does not require oil lubrication and which is designed to support necessary shaft thrust loading by the utilization of a dry gas film. The bearing includes a shaft rotor between two axially movable stators and relies on a dry gas film to separate the rotor and stators. The stators are axially loaded by a double spring package arranged in series wherein a lightly loaded spring engages the stator during zero thrust applications, and as the shaft begins to rotate and encounter axial thrust, a heavier stiffer spring, greater than the thrust load, quickly engages.

11 Claims, 6 Drawing Sheets

(56) References Cited

U.S. PATENT DOCUMENTS

| | | |
|---|---|---|
| 4,135,772 A | 1/1979 | Stodt |
| 4,277,111 A | 7/1981 | Gray et al. |
| 4,331,365 A | 5/1982 | Miller, Jr. |
| 4,856,914 A * | 8/1989 | Sigg ............................. 384/223 |
| 5,183,340 A | 2/1993 | Higginbotham |
| 5,433,529 A | 7/1995 | Hensel |
| 5,741,116 A * | 4/1998 | Hudson ......................... 415/104 |
| 6,200,035 B1 | 3/2001 | Otsuki |
| 7,063,465 B1 * | 6/2006 | Wilkes et al. ................. 384/308 |
| 7,997,802 B2 | 8/2011 | Simon |

* cited by examiner

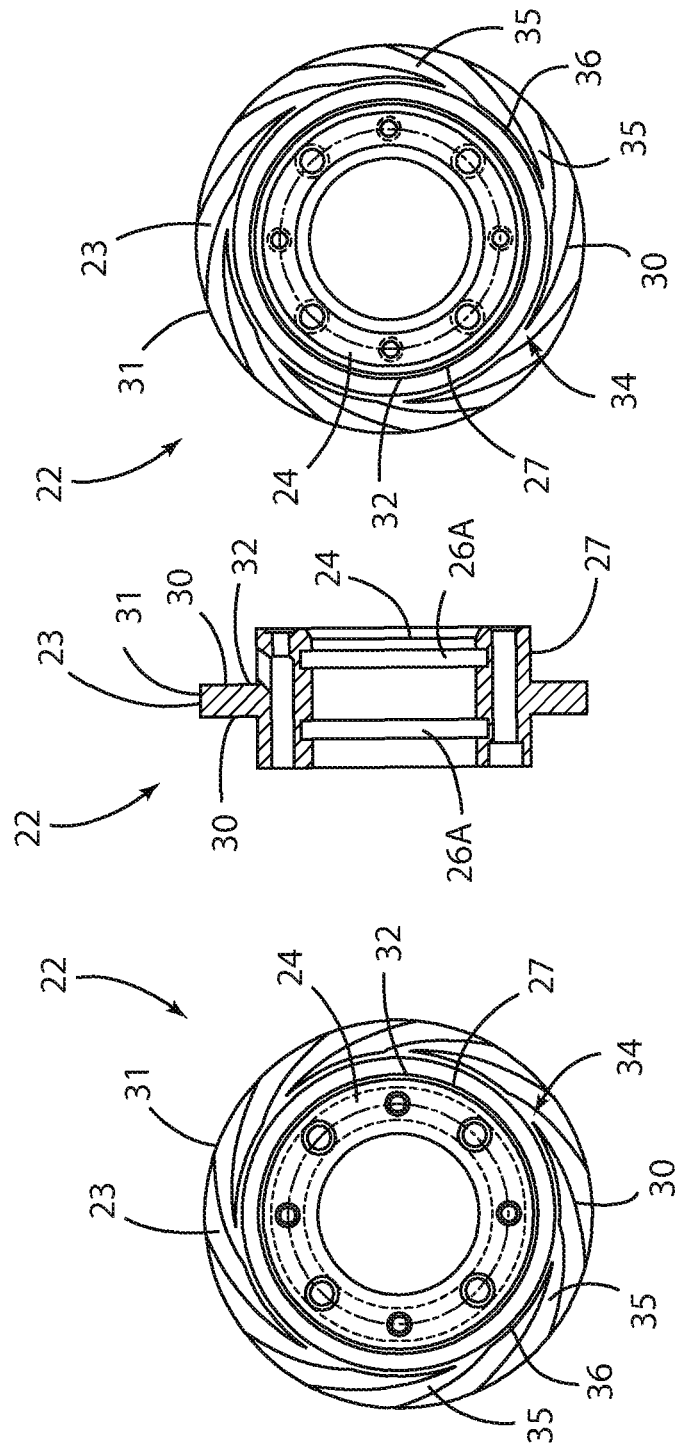

DRY GAS THRUST BEARING FOR USE IN ROTATING EQUIPMENT

CROSS REFERENCE TO RELATED APPLICATIONS

This application claims priority of U.S. Provisional Patent App. No. 61/613,059, the disclosure of which is incorporated herein by reference.

FIELD OF THE INVENTION

The present invention relates to a dry gas thrust bearing for use in rotating equipment and more particularly, relates to a bearing designed to support compressor/turbine thrust loads in an improved arrangement which does not require oil lubrication and which is designed to support necessary shaft thrust loading by the utilization of a dry gas film.

BACKGROUND OF THE INVENTION

In various types of rotating equipment having a rotating shaft, thrust bearings are conventionally provided in cooperative engagement with the shaft to accommodate thrust loads to which the shaft may be subjected. Thrust bearings may use liquid lubrication between a rotor mounted to a shaft and stators which are provided together to axially support the rotor and associated shaft when subjected to thrust loads. Such thrust loads may be generated by various causes, such as operational loads encountered during operation of the rotating equipment.

The invention relates to a dry gas thrust bearing for use in various types of rotating equipment. The thrust bearing will preferably be used in equipment such as turbines, expanders, and compressors, although it will be understood that the inventive thrust bearing could be applied to any type of turbomachinery equipment requiring shaft thrust retention. The device could also be installed in equipment used in other applications in which conventional liquid lubricated thrust bearings could not be applied.

The invention comprises a double symmetrical rotating arrangement that provides a shaft mounted rotor which is formed as an annular radial flange projecting radially, preferably from the shaft. The rotor has opposed bearing faces which face in opposite axial directions, and the thrust bearing further includes a pair of thrust ring stators which include respective bearing faces which face axially towards the rotor bearing faces. During shaft rotation, the rotor bearing faces rotate relative to the stator bearing faces. The stators preferably are axially movable relative to the rotor and include biasing means preferably formed as a spring package which biases the stators towards the rotor bearing faces. While the stators are axially movable and biased, the rotor could also use axially movable rings to define the rotor bearing faces and in turn, the stators in such an instance could be axially fixed.

Some or possibly all of these bearing faces include hydrodymanic lift features which hydrodynamically generate a dry gas fluid film between the rotor and stator bearing faces during relative rotation thereof. In other words, the fluid film is generated during rotation of the rotor relative to the stationary stator bearing faces which occurs during shaft rotation. The hydrodynamic lift features rely on a dry gas film being generated between the opposing bearing faces to axially separate each stator from the opposing rotor. Sufficient film stiffness is generated between the bearing faces to counterbalance the thrust load produced from a rotating shaft. One inventive feature of the present invention includes the retention method for the biasing means which provides a flexible mounting, preferably for each bearing stator.

The biasing means preferably is formed as an inventive double spring arrangement which acts on the respective back face of each stator to normally bias each stator toward the rotor while still permitting each stator to move axially away from the rotor as a result of hydrodynamic lift generated by the fluid film and as a result of thrust loads imparted by the shaft which shaft may displace axially under such thrust loads.

Prior to and during shaft axial movement, the double springs are arranged in series to provide two functions. First, a lightly loaded spring engages the stator thrust ring assembly during zero thrust applications. Second, as the shaft begins to rotate and encounter thrust, a heavier stiffer spring, greater than the thrust load, quickly engages. The stiffer spring allows the stator to remain flexibly mounted during dynamic operation. The dry gas bearing was designed to support various upset thrust excursions during operation including shaft thrusting in the opposite direction.

The inventive thrust bearing provides the double springs stacked in series, wherein these two separate springs provide separate spring rates. One spring delivers a low spring force while the second spring delivers a high spring force.

The smaller spring rate allows the dry gas thrust bearing to maintain a light pre-load during initial start-up. This light spring load provides the ability to generate the necessary film stiffness for supporting the thrust load developed during dynamic operation. The thrust load tends to increase as a function of increasing speed.

When the thrust load exceeds the loading of the smaller spring, this smaller spring becomes non-functional and the heavy (increased stiffness) spring engages thereby supporting the stationary thrust bearing face. This transition occurs within very limited axial shaft travel. Preferably, the approximate shaft travel is less than 0.254 mm (0.010") for shaft size diameters less than 2.54 cm (1 inch).

The double spring feature is a unique concept that provides a buffer period during static to dynamic operation. During this transition, the bearing faces generate the necessary film stiffness for adequate thrust load support.

Other objects and purposes of the invention, and variations thereof, will be apparent upon reading the following specification and inspecting the accompanying drawings.

BRIEF DESCRIPTION OF THE DRAWING FIGURES

FIG. 2 is a first side end view of a shaft-mountable rotor;

FIG. 3 is a cross-sectional view of the rotor;

FIG. 4 is a second side end view of the rotor;

Figure 1:
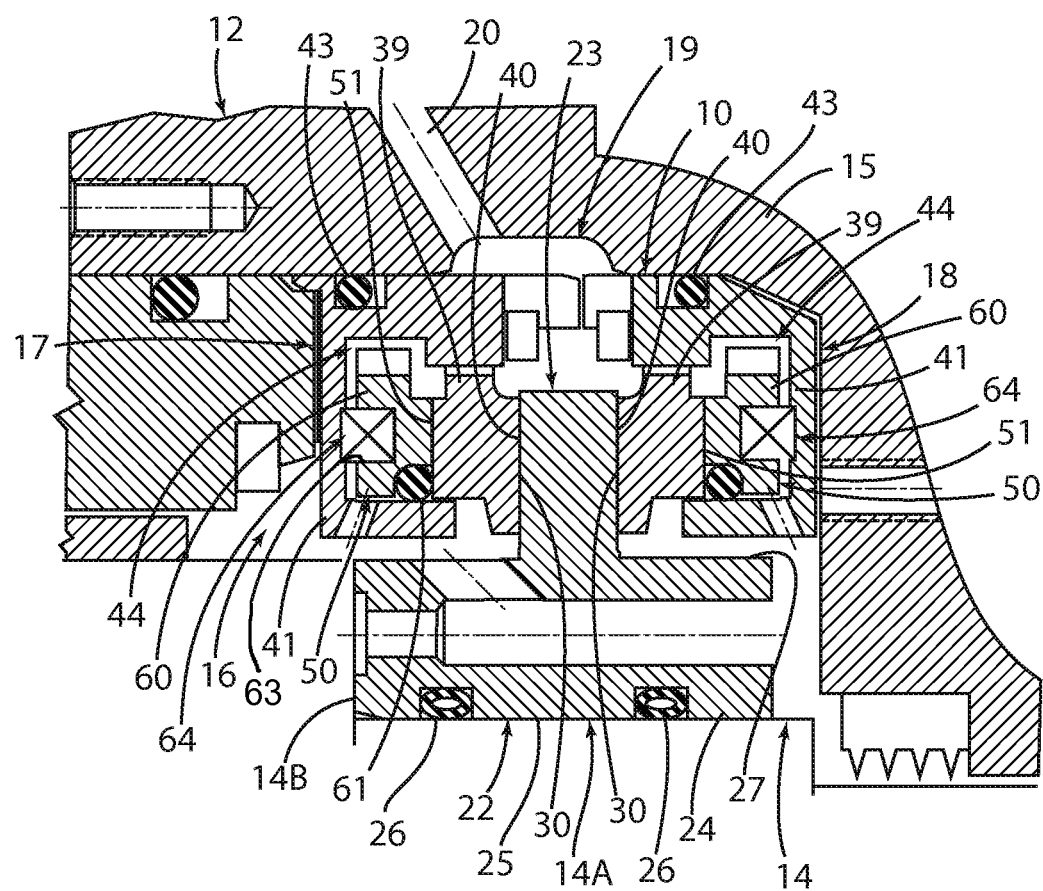
FIG. 1 is a cross-sectional view of a dry gas thrust bearing of the invention.

Certain terminology will be used in the following description for convenience in reference only and will not be limiting. The words "up", "down", "right" and left" will designate directions in the drawings to which reference is made. The words "in" and "out" will refer to directions toward and away from, respectively, the geometric center of the device and designated parts thereof. The words "proximal" and "distal" will refer to the orientation of an element with respect to the device. Such terminology will include derivatives and words of similar import.

DETAILED DESCRIPTION

Referring to FIG. 1, the invention relates to a dry gas thrust bearing 10 for use in rotating equipment 12 having a rotatable shaft 14. The thrust bearing 10 will preferably be used in equipment such as turbines, expanders, and compressors, although it will be understood that the inventive thrust bearing 10 could be applied to any type of turbomachinery equipment requiring shaft thrust retention. The device could also be installed in equipment used in other applications in which conventional liquid lubricated thrust bearings could not be applied.

In one exemplary use, the thrust bearing 10 may be provided in a downhole application such as a well pipe where the shaft 14 is oriented vertically for rotation about a central rotation axis. In this application, the well pipe contains process fluid in the form of a gas, and the shaft 14 typically would be driven by a turbine and the shaft 14 would in turn drive a compressor acting on the process fluid. It will be understood that various motive devices may be used to drive the shaft such as a motor.

The process fluid also may be other types such as a liquid where the shaft is being driven to operate a pump impeller. The thrust bearing 10 of the invention is not limited to specific equipment and environments, and can be used on any shaft where suitable in both a vertical orientation as well as a horizontal orientation.

In the downhole application described above, the shaft 14 may rotation at high speeds, such as 100,000 rpm, and operational pressures may be on the order of 6894.75 kPa (1000 psi) or more with some differential pressure occurring across the bearing face region. For example, the pressure on one side of the bearing face region may differ from the pressure on the other side with a differential pressure of 103.42 kPa (15 psi) across the bearing face region.

During rotation of the shaft 14, rotating equipment may encounter thrust loads which act axially along the rotation axis of the shaft 14 and which tend to move the shaft 14 axially. The thrust bearing 10 of the invention is provided to accommodate and support these thrust loads while preventing rotating components from axially striking stationary components disposed axially adjacent thereto, wherein axial displacement and contact in this manner can otherwise damage the equipment components. The thrust bearing 10 prevents such contact and still accommodates some axial displacement of the shaft 14. Further, such thrust loads can occur in both axial directions along the shaft 14, and therefore, the thrust bearing 10 provides support in both axial directions.

As to the illustrated components of the rotating equipment 12, the shaft 14 has a stepped configuration along its length wherein the shaft diameter decreases stepwise in the rightward direction of FIG. 1. The thrust bearing 10 mounts to an intermediate step 14A and abuts axially on one side against an axial-facing shoulder 14B.

The shaft 14 extends through an equipment housing 15, and specifically extends axially through a housing chamber 16. A central portion of the housing chamber 16 is defined on opposite ends by axial-facing, opposing, housing end walls 17 and 18, and an annular, outer wall 19 which faces radially inwardly towards the outer surface of the shaft 14. This housing chamber 16 may include a fluid port 20 which opens through the outer wall 19. The thrust bearing 10 thereby mounts to the intermediate step 14A of the shaft 14, and is disposed within the housing chamber 16.

More particularly as to the thrust bearing 10, the thrust bearing 10 of the invention comprises a double symmetrical rotating arrangement that provides a shaft mounted rotor 22 (see FIGS. 1-4) which comprises an annular radial flange 23 projecting radially outwardly, preferably away from the shaft 14. The rotor 22 further comprises a rotor body 24 which is cylindrical and fits onto the shaft step 14A. An inside rotor diameter 25 has resilient centering devices 26, such as a garter spring, which seat within circumferential grooves 26A and center against the opposing shaft surface, wherein the rotor body 24 is fastened to the shaft 14 so as to rotate in unison therewith.

The rotor flange 23 projects radially outwardly from the outside rotor diameter, which is defined by an outer surface 27 of the rotor body 24. The rotor flange 23 preferably is located at a middle region along the axial length of the rotor body 24.

To accommodate axial thrust loads, the flange 23 of the rotor 22 has opposed, annular bearing faces 30 (FIGS. 1-4) which extend radially outwardly from the outer rotor surface 27 and face away from each other in opposite axial directions. The bearing faces 30 have an annular shape and extend circumferentially so as to define an outside diameter 31 and an inside diameter 32.

The rotor bearing faces 30 preferably are provided with hydrodynamic lift features 34 which preferably are derived from existing Gaspac technology currently being sold by Flowserve Corporation as part of their mechanical seal product line. The hydrodynamic lift features 34 preferably are formed as shallow, spiral grooves which are identified by Flowserve as their Advanced Pattern Groove, which groove pattern typically is used in mechanical seals to provide a static seal which occurs when a shaft is not rotating, and provide a hydrodynamic seal during shaft rotation. In the present invention, these hydrodynamic lift features generally include shallow spiral grooves 35 which communicate with a shallow annular groove 36 wherein fluid is pumped radially inwardly through these grooves during shaft rotation to generate a fluid film between opposed bearing faces which axially separates such faces as described in more detail below. The lift features 34 therefore are provided in the present invention to generate the fluid film during shaft rotation, and more specific details as to the specific construction of such Advanced Pattern Grooves are not required herein. It will be understood that the hydrodynamic lift features 34 are not limited to the specific groove pattern shown in FIGS. 2 and 4 and that other types of hydrodynamic lift features may also be used so long as suitable hydrodynamic lift and film stiffness is generated by such lift features. Additionally, the lift features 34 may be of a type which are bi-directional or in other words, generate a fluid film regardless of which direction a shaft rotates.

Figure 5:
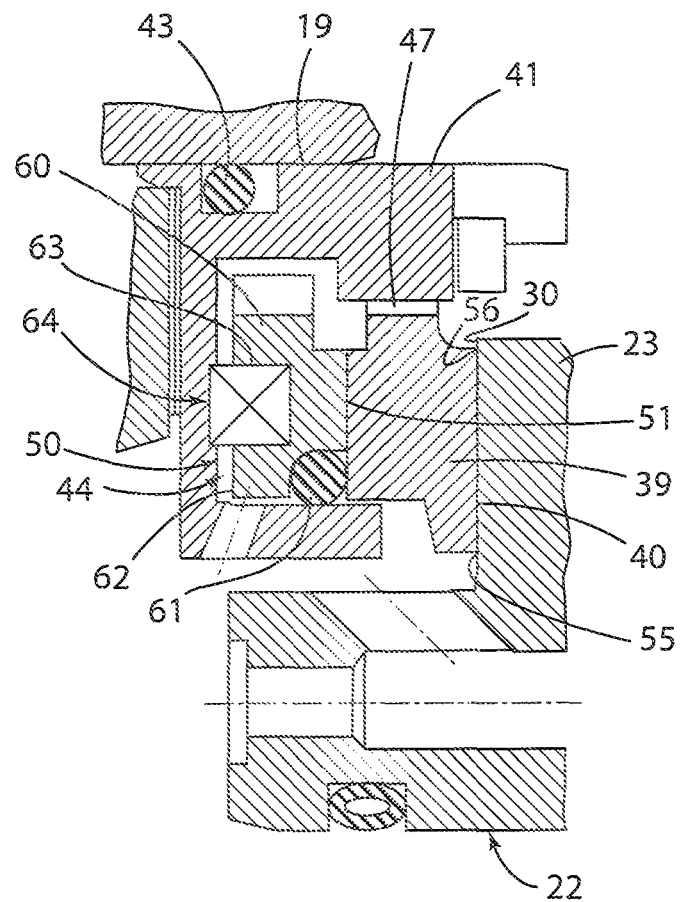
FIG. 5 is an enlarged cross-sectional view of a stator.

Referring to FIGS. 1 and 5, the thrust bearing 10 further includes a pair of thrust ring stators 39 which include respective bearing faces 40 which face axially toward the rotor bearing faces 30. These stators 39 are each formed as an annular ring which is non-rotatably supported within a support housing 41, which support housing 41 is stationarily supported within the equipment housing 15. Each support housing 41 abuts axially against the housing end wall 18 and is radially sealed against the outer housing wall 19 by a respective O-ring 43. Each support housing 41 includes an annular support channel 44 which receives the ring-shaped stator 39 wherein the stator 39 is axially slidable within the support channel 44 to permit formation of the fluid film. However, the stator 39 is non-rotatably engaged with the support housing 41 by keys 47 or the like which are located on the outside diameter of the stator 39. As such, the stators 39 do not rotate but are able to axially move to permit formation of a fluid film between the bearing faces 30 and 40 and accommodate thrust loads as described further below.

More particularly during shaft rotation, the rotor bearing faces 30 rotate relative to the respective opposing ones of the stator bearing faces 40, wherein the hydrodynamic lift features 34 generate the fluid film between the opposed bearing faces. The stators 39 are axially movable relative to the rotor 22 but the stator housings 41 includes biasing means 50 which act on a back face 51 of a respective stator 39 to bias the stators 39 towards the stator bearing faces 30 while still permitting axial separation therebetween. While the stators 39 are axially movable and biased, the rotor 22 could also use axially movable rings to define the rotor bearing faces 30 and in turn, the stators 39 in such an instance could be axially fixed.

Preferably the bearing faces 30 include the hydrodymanic lift features 34 which hydrodynamically generate a fluid film between the rotor and stator bearing faces 30 and 40 during relative rotation thereof. In other words, the fluid film is generated during rotation of the rotor faces 30 relative to the stationary stator bearing faces 40 which occurs during shaft rotation. While the lift features 34 are provided only on the rotor bearing faces 30, such lift features 34 or other types of such features could be provided on any or all of the bearing faces 30 and 40 if this proved suitable for a particular application.

The hydrodynamic lift features 34 rely on a dry gas film being generated between the opposing bearing faces 30 and 40 to axially separate each stator 39 from the opposing rotor bearing face 30. Sufficient film stiffness is generated between the bearing faces 30 and 40 to counterbalance any thrust load carried by the rotating shaft 14. Therefore, if the shaft 14 encounters a thrust load and is displaced axially, the axial force is transmitted axially to the stators 39 which are able to axially accommodate such load since the stators 39 are displaceable axially. During shaft rotation, the axial movement of the rotor 22 is imparted or transferred to the stators 39 by the fluid film formed between the bearing faces 30 and 40. Generally referring to FIG. 5, the fluid film forms across most or all of the radial width of the bearing region which extends between the inside diameter 55 (ID) and the outside diameter 56 (OD) of each stator bearing face 40. As such, the bearing faces 30 and 40 normally are in contact when the shaft 14 does not rotate and may be in contact at startup as the shaft 14 begins to rotate. After sufficient rotational speed is developed by the shaft 14, the fluid film forms and the bearing faces 30 and 40 separate to a small degree. The fluid film has a film stiffness which governs the amount of axial load that the fluid film can handle while maintaining the bearing faces 30 and 40 separated from each other. Hence, even if the shaft 14 moves axially under a thrust load, the fluid film preferably has enough film stiffness to prevent bumping or contact of the rotor bearing face 40 against the respective stator bearing face 40 which bumping can otherwise damage the bearing components.

One inventive feature of the present invention includes the retention method for the biasing means 50 which provides a flexible mounting, preferably for each bearing stator 39. The biasing means 50 preferably is formed as an inventive double spring arrangement which acts on the respective back face 51 of each stator 39 to normally bias the stator 39 toward the rotor 22, while the biasing means 50 still allows the stator 39 to move axially away from the rotor 22 in response to hydrodynamic lift generated by the fluid film and as a result of any thrust loads imparted by the shaft 14 which shaft 14 may displace axially under such thrust loads.

Figure 6:
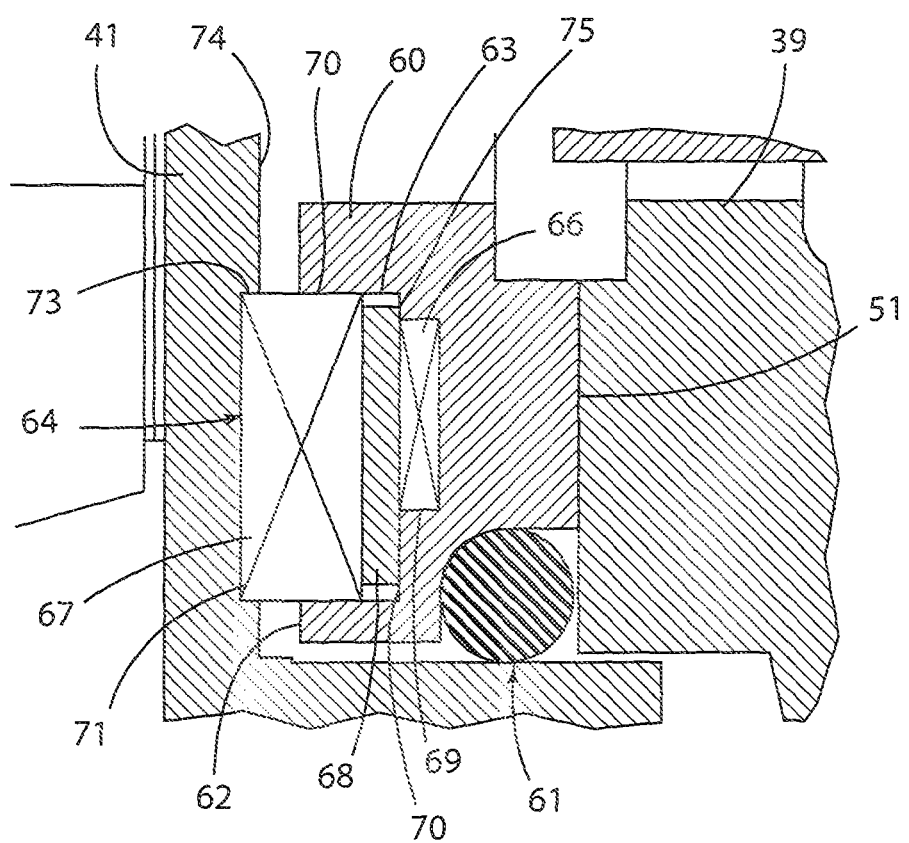
FIG. 6 is an enlarged view of the stator of FIG. 5 showing additional detail as to a spring package axially supporting the stator.

Referring to FIGS. 1 and 5, the biasing means 50 is shown as including a stator thrust or backing ring 60 which abuts against the back stator face 51 and is axially movable therewith within the housing channel 44. The inside diameter of the backing ring 60 is sealed by an O-ring 61. Referring to FIG. 5, the back face 62 of the backing ring 60 includes an annular, channel-like spring pocket 63 which opens rearwardly and receives a spring package 64 therein. For illustrative purposes in FIGS. 1 and 5, the spring package 64 is shown as a single block fitted within the spring pocket 63 although the inventive spring package 64 is an assembly of components. FIG. 6 illustrates the individual components of the spring package 64. It will be understood that the following discussion primarily relates to the leftward stator assembly, but this discussion is equally applicable to the rightward stator assembly.

More particularly as to FIG. 6, the spring package 64 comprises a first lighter spring 66 and a second heavier spring 67, which are separated by an intermediate spring plate 68. Both springs 66 and 67 preferably are formed as wave springs which generate relatively light and heavy spring performance. For illustrative purposes, the springs 66 and 67 are shown as different size boxes showing the axial spring thickness, although it will be understood that a cross section of a wave spring would show a smaller rectangle and the axial position of the cross-sectional rectangle would vary depending upon the location along the wave that the cross-section is cut. In the boxes used to show the springs 66 and 67, essentially the left edge of each spring shows the peak of one wave in the spring and the right edge of each spring shows the peak of a circumferentially adjacent wave.

The spring plate 68 is formed as a flat, annular plate and is provided in series between the two springs 66 and 67 to transfer axial loads therebetween. Further, the spring plate 68 prevents the waves of the springs 66 and 67 from nesting one within the other so that each spring can deform independently of the other spring.

The spring pocket 63 is formed with a smaller pocket portion 69 which has a smaller radial dimension than the larger pocket portion 70 that opens from the backing ring face 62. The smaller pocket portion 69 is formed in a bottom face 70 of the pocket 63 and receives the smaller and lighter spring 66 therein, while the larger pocket portion receives the spring plate 68 and the heavier spring 67 therein. The heavier spring 67 projects axially out of the pocket 63 and preferably, has the left free end 71 seated within a shallow channel-like spring seat 73 that is formed in the interior face 74 of the support housing 41. The spring seat 73 helps to radially locate the spring package 64 and backing ring 60.

Figure 7:
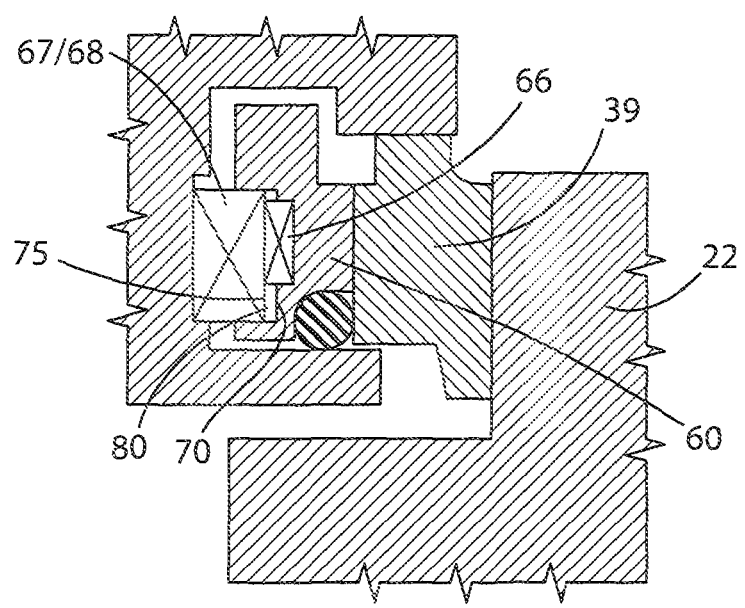
FIG. 7 is a diagrammatic view of the bearing in a first operative condition before shaft rotation.

In FIG. 6, the spring plate 68 is shown with an inner plate face 75 disposed in close, if not abutting contact with the bottom pocket face 70. Normally, the lighter spring 66 has an axial dimension greater than the depth of the pocket portion 69 such that the lighter spring 66 projects out of the pocket portion 66. This is shown in FIG. 7. FIG. 6, however, shows a collapsed condition for the spring 66 wherein the spring plate 68 is normally spaced from the bottom pocket face 70 but is shown after backing ring 60 and stator 39 have moved leftwardly so that the bottom face 70 now contacts the spring plate 68. This movement is described in more detail relative to FIGS. 7 and 8.

In FIG. 7, the spring 66 is shown in an expanded condition projecting out of the pocket portion 69 (FIG. 6) so that a gap 80 is formed between the bottom pocket face 70 and the inner plate face 75. For illustrative purposes in FIGS. 7 and 8, a single block is used to illustrate the heavier spring/spring plate 67/68, although these are obviously two individual components as shown in FIG. 6. The gap 80 is present in a non-thrust position for the stator 39 and the stator backing or thrust ring 60. The small spring 66 provides an initial bearing pre-load while the large spring 67 is non-loaded. The gap 80 allows the fluid film to form during shaft rotation, during which the stator 39 displaces a small distance axially to the left (or the right in the case of the rightward stator 39 shown in FIG. 1). The gap 80 is still present during this condition and the gap 80 permits a small range of axial movement for the stator 39.

Figure 8:
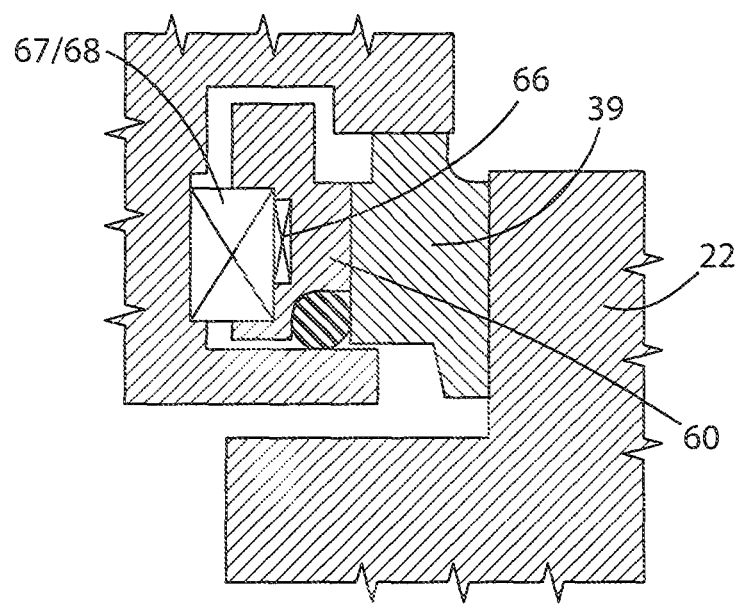
FIG. 8 is a diagrammatic view of the bearing in a second operative condition during shaft rotation wherein the rotor is subjected to thrust loading.

As to FIG. 8, the gap 80 disappears as the spring 66 compresses or collapses wherein the plate face 75 contacts the pocket face 70 as also shown in FIG. 6. The absence of a gap indicates a thrust position wherein axial thrust carries through the rotor 22 and transfer to the stator 39 and stator thrust ring 60. During shaft rotation, these thrust loads are carried between the bearing faces 30 and 40 through the fluid film by the film stiffness exhibited thereby. In this condition, the small spring 66 provides no additional load and the large spring 67 is engaged or is activated to provide heavier spring support and thereby support the various thrust loads.

In operation, the spring package 64 on each of the rotors 39 can support thrust loads in both axial directions. Prior to and during axial shaft movement, the double springs 66 and 67 of each spring package 64 are arranged in series to provide two functions. First, the lightly loaded spring 66 engages the stator thrust ring assembly during zero thrust applications so that each stator 39 is lightly biased against the rotor 22. Second, as the shaft 14 begins to rotate and encounter thrust in one axial direction or the other, the heavier stiffer spring 67, which generates load support greater than the thrust load, quickly engages. The stiffer spring 67 allows the stator 39 being subjected to the thrust load to remain flexibly mounted during dynamic operation. The dry gas bearing 10 was designed to support various upset thrust excursions during operation including shaft thrusting in the opposite direction.

The inventive thrust bearing provides the double springs 66 and 67 stacked in series, wherein these two separate springs 66 and 67 provide separate spring rates. One spring 66 delivers a low spring force while the second spring 67 delivers a high spring force.

The smaller spring rate allows the dry gas thrust bearing 10 to maintain a light pre-load during initial start-up as seen in FIG. 7. This light spring load provides the ability to generate the necessary film stiffness for supporting the thrust load developed during dynamic operation. The thrust load tends to increase as a function of increasing speed.

When the thrust load exceeds the loading of the smaller spring 66, this smaller spring 66 becomes non-functional in the condition of FIGS. 6 and 8 and the heavy (increased stiffness) spring 67 engages, thereby supporting the stationary thrust bearing face 40. This transition occurs within very limited axial shaft travel. Preferably, the approximate shaft travel is less than 0.254 mm (0.010") for shaft size diameters less than 2.54 cm (1 inch), which travel is defined by the gap 80 (FIG. 7).

The double spring feature is a unique concept that provides a buffer period during static to dynamic operation. During this transition, the bearing faces 30 and 40 and the hydrodynamic lift features 34 generate the necessary film stiffness for adequate thrust load support. The provision of small and large springs 66 and 67, aligned in series, is a unique feature in the design and these springs function during normal conditions and thrust load conditions.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A dry gas thrust bearing for use in rotating equipment, said thrust bearing comprising:
   a double symmetrical rotating arrangement that includes a shaft mounted rotor which is formed as an annular radial flange projecting radially from said shaft, said rotor having opposed bearing faces which face in opposite axial directions; and
   said thrust bearing further including a pair of thrust ring stators which include respective bearing faces which face axially towards said rotor bearing faces, wherein during shaft rotation, said rotor bearing faces rotate relative to the stator bearing faces, said stators being axially movable relative to said rotor and including biasing means formed as a spring package which biases said stators towards said rotor bearing faces, said biasing means being formed in a double spring arrangement which acts on a respective back face of each said stator to normally bias each said stator toward the rotor while still permitting each said stator to move axially away from the rotor.

2. The thrust bearing according to claim 1, wherein some or all of said bearing faces include hydrodymanic lift features which hydrodynamically generate a dry gas fluid film between the rotor and stator bearing faces during relative rotation thereof.

3. The thrust bearing according to claim 2, wherein the fluid film is generated during rotation of the rotor relative to the stationary stator bearing faces which occurs during shaft rotation.

4. The thrust bearing according to claim 2, wherein said bearing faces are separable as a result of hydrodynamic lift generated by the fluid film and as a result of thrust loads imparted by the shaft which shaft may displace axially under such thrust loads.

5. The thrust bearing according to claim 4, wherein said hydrodynamic lift features rely on a dry gas film being generated between the opposing bearing faces to axially separate each stator from the opposing rotor, wherein sufficient film stiffness is generated between the bearing faces to counterbalance the thrust load produced from a rotating shaft.

6. The thrust bearing according to claim 1, wherein said spring package comprises double springs arranged in series.

7. The thrust bearing according to claim 6, wherein said double springs comprise a lightly loaded first spring which engages the stator thrust ring assembly during zero thrust applications, and a heavier stiffer second spring, which engages as the shaft begins to rotate and encounter thrust.

8. The thrust bearing according to claim 7, wherein said second spring generates a biasing force greater than the thrust load.

9. The thrust bearing according to claim 1, wherein said spring package comprises double springs stacked in series, wherein these two separate springs provide separate spring rates, one smaller spring delivering a low spring force while the second larger spring delivers a high spring force.

10. The thrust bearing according to claim 9, wherein the smaller spring rate allows the dry gas thrust bearing to maintain a light pre-load during initial start-up, which provides the ability to generate the necessary film stiffness for supporting the thrust load developed during dynamic operation.

11. The thrust bearing according to claim 10, wherein when the thrust load exceeds the loading of the smaller spring, said smaller spring becomes non-functional and the larger spring engages thereby supporting the stationary thrust bearing face.

* * * * *